Figure 1:
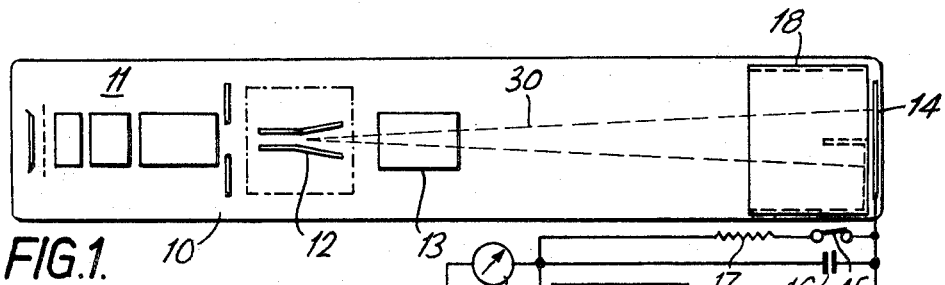

United States Patent

[11] 3,584,926

| [72] | Inventor | Christopher Davies<br>Levenshulme, Manchester, England |
|---|---|---|
| [21] | Appl. No. | 829,996 |
| [22] | Filed | June 3, 1969 |
| [45] | Patented | June 15, 1971 |
| [73] | Assignee | National Research Development Corporation<br>London, England |
| [32] | Priority | June 4, 1968 |
| [33] | | Great Britain |
| [31] | | 26495/68 |

[54] CATHODE-RAY TUBES FOR SIGNAL AVERAGING OR TOTALIZING
14 Claims, 6 Drawing Figs.

[52] U.S. Cl. .................................................. 315/21
[51] Int. Cl. ................................................. H01j 29/76
[50] Field of Search ..................................... 315/21

[56] References Cited
UNITED STATES PATENTS

| 2,202,376 | 5/1940 | Hansell | 315/21 X |
| 2,305,617 | 12/1942 | Hansell | 315/21 |
| 2,941,074 | 6/1960 | Poole | 315/21 X |

Primary Examiner—Rodney D. Bennett, Jr.
Assistant Examiner—Brian L. Ribando
Attorney—Cushman, Darby and Cushman ABSTRACT: A cathode-ray tube is provided for use in apparatus for totalizing or averaging time-varying signals. The tube has a number of discrete conductive elements coupled to capacitors, and the capacitors are charged, while the elements are scanned by the electron beam of the tube, to an amount dependent on the instantaneous value of an applied signal to be averaged or totalized. One electrode of each capacitor may be one of the elements. The beam may be deflected on and off a collector electrode to control the charging of the capacitors. Readout is by finding the charge on the capacitors after the signal has been applied a plurality of times, and may be by voltage or current sampling.

3,584,926

CATHODE-RAY TUBES FOR SIGNAL AVERAGING OR TOTALIZING

The present invention relates to cathode-ray tubes for use, particularly but not exclusively, in averaging or totalizing time-varying signals.

Signal averaging or totalizing is useful where a required signal which can be repeated is accompanied by noise, and/or where it is required to know the average variation of a repetitive signal with time. The method of obtaining the desired signal, with an improved signal-to-noise ratio, or finding how the signals vary, is briefly to repeat the signal or allow several cycles of the repetitive signal and samples of the repeated signal to give a number of totalized samples, the totals being proportional to the average variation of the signal with time, and then, if required, find the averages of these samples.

Although the operation described in the preceding paragraph can be performed with known apparatus for signals having low-repetition frequencies, it is difficult to carry out where the duration of the period of the signal is shorter than 100 nanoseconds.

A sampling oscilloscope could be used to record such a signal, and then feed it, relatively slowly, to a signal averager, which would then provide an output by totalizing and where required averaging samples of the recorded signal, but since a sampling oscilloscope records only about 0.3 nanoseconds of every 10 microseconds much information would be rejected.

Where the signal consists of a pulse whose time interval from a certain event is the signal characteristic and the signal is capable of being repeated to give further pulses, a multichannel analyzer may be used. The analyzer records, in which of a number of intervals the pulse occurs but cannot record more than one pulse for each signal repetition. Clearly inaccuracies begin to occur when there is a significant probability that there will be more than one pulse in each repetition.

Another averaging apparatus which rejects much information is the boxcar integrator. This consists, briefly, of a capacitor and a gate, the gate being opened for a short interval at a given time in each signal repetition after the time of origin. To cover the whole signal the time for opening the gate is changed progressively to cover the whole period of the signal, after an average or total for the preceding interval has been determined.

Where an average is required the capacitor is shunted by a resistor so that the charge leaks away and the average charge applied to the capacitor determines the charge on readout, since when noise is averaged the final charge is proportional to the desired signal. In the boxcar integrator noise applies charges greater than and smaller than the true signal which in time cancel each other.

For totalizing the shunt resistor is omitted. The charge on the capacitor can then be shown to be proportional to the desired signal times the number of repetitions, and also proportional to the noise times the square root of the number of repetitions. Clearly as repetitions are carried out noise is reduced.

Another way of finding the average or total which does not reject so much information is to use a signal-averaging computer, but these are limited to signals with repetition intervals of 1 microsecond or longer. One such computer is the waveform eductor which is basically a plurality of boxcar integrators with gates which can be opened successively to cover the whole period of a repetitive signal. At present, the gates of the eductor are opened for a minimum of 1 microsecond, and therefore cannot be used for repetitive signals having a period of, for example, only 100 nanoseconds. However it is expected that faster eductors could be made, but these would require a large number of accurately controlled gates and would consequently be expensive and inflexible.

According to one aspect of the present invention there is provided a cathode-ray tube for use in apparatus for totalizing or averaging time-varying signals, including an electron gun for providing a beam of electrons, means for causing the electron beam to scan a plurality of discrete conductive elements, and charge-control means for so controlling the charge on each element after scanning, in accordance with an applied signal that, in operation when a signal to be totalized or averaged is applied to the charge-control means, each conductive element receives a charge determined by the value of the applied signal at the time when that element is scanned.

Thus, in one example, if the applied signal is 0 when an element is scanned the beam does not reach that element, while if the applied signal is at maximum the whole beam impinges on the element.

Provided the scanning means includes variable time-base means which in operation ensures that each storage element is scanned at the same time in each period of a repetitive applied signal, the charge on the storage elements is an indication of the desired totalized signal. Averaging means coupled to the storage elements may be provided to give an indication of the desired averaged signal. The invention has the advantage of fast switching between storage elements so that repetitive signals may be averaged or totalized when they contain frequencies having periods of only 1 nanosecond or less. Further true signal averaging is carried out making use of all the information available, instead of using information from a single sample in each signal repetition. It is also simple in construction and, since it does not require a large number of components, relatively cheap.

The charge-control means may intensity modulate the electron beam, but then the capacity between a grid, used for this purpose, and other electrodes is a disadvantage, and the grid requires a high-stand-off bias voltage making it difficult to apply a modulating signal safely.

As an alternative the charge-control means may include a collector electrode and deflection means for so deflecting the beam, in accordance with the applied signal, that the position of the beam in relation to the collector electrode is varied and the proportion of electrons in the beam reaching each conductive element is determined by the value of the applied signal when that element is scanned.

This method of modulation has the advantages that modulation, scanning and readout terminals of the tube can be at or near earth potential, and no DC coupling is required to a cathode which is probably several kilovolts negative.

The collector electrode is preferably a hollow rectangular parallelepiped. Except for two opposite sides, one of which is completely open, the sides are rectangular conducting plates, and part of the other of the said opposite sides is covered by a further rectangular plate joining three of the other plates. The masking electrode is so positioned adjacent the face of the tube that the electron beam can pass through the electrode by way of the said opposite sides, so long as it is deflected to pass the covered half side.

The storage elements may include elongated parallel conducting strips adjacent to the face of the tube. If a collector electrode is used the strips are preferably at right angles to that edge of the further plate which is not in contact with other plates.

In apparatus for signal averaging or totalizing, which includes cathode-ray tubes according to either aspect of the invention, a plurality of capacitors may be provided, one associated with, and coupled to, each storage element. The capacitors then accumulate charges proportional to the totalized signal. If each capacitor also has an associated resistor shunted across it, the capacitor charges are proportional to the averaged signal.

Readout may be by several methods; for example by finding the charges on the capacitors by measuring the current in a common lead through which discharge currents flow when the capacitors are discharged; readout means coupled in sequence to the capacitors may be used, or the electron-beam current or masking-electrode current may be measured during a readout scan of the elements by the beam.

The capacitors may be formed by the strips, a suitable dielectric and a common backing plate which may be inside or outside the tube.

Figure 2:
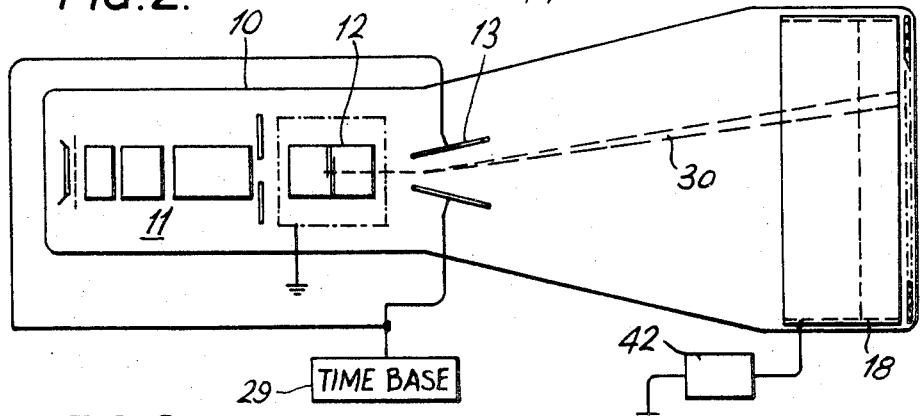
Figure 3:
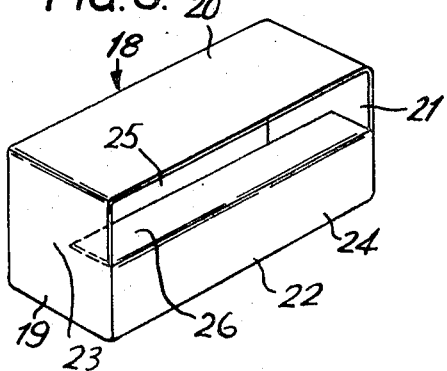
Figure 5:
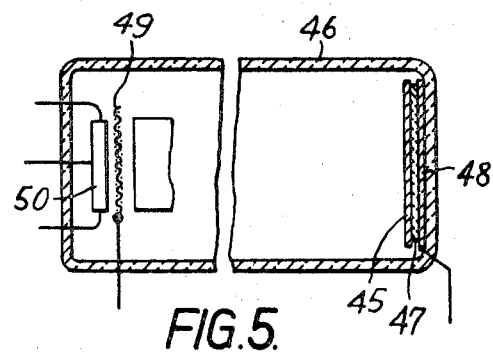
Figure 4:
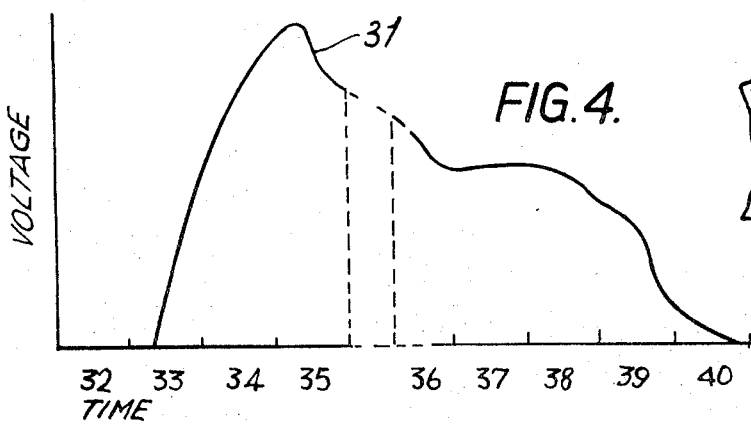
Figure 6:
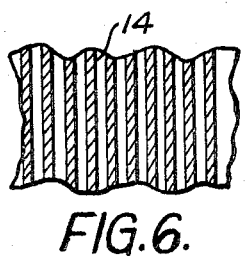

Certain embodiments of the invention will now be described, by way of example, with reference to the accompanying drawings, in which:

FIG. 1 is a side view of a cathode-ray tube according to one embodiment of the invention, FIG. 2 is a plan view of the cathode-ray tube of FIG. 1, FIG. 3 is a perspective view of a masking electrode used in the cathode-ray tube of FIG. 1, FIG. 4 is an example of one cycle of a repetitive signal, used in explaining the invention, FIG. 5 is a cross section of part of a cathode-ray tube according to another embodiment of the invention, and FIG. 6 is a cutaway front view of the cathode-ray tube face shown in FIGS. 1, 2 and 5.

In FIGS. 1 and 2, a cathode-ray tube 10 has a conventional electron gun, brilliance, focus and astigmatism means, together designated 11, vertical or y-deflection plates 12, and horizontal or x-deflection plates 13. On the interior face of the tube 10 there are 100 vertical conducting strips, one of which 14 is shown in FIG. 1 and others of which are shown in FIG. 6. For a tube face 10 centimeters across, the strips are 1 millimeter wide by 2 centimeters long. Each of the conducting strips has an associated switch, capacitor and resistor to which it is connected. Only the switch 15, the capacitor 16 and the resistor 17 associated with the strip 14 are shown in FIG. 1 and more of these components are shown in Fig. 2. The capacitor 16 and the resistor 17 are connected in parallel between the strip 14 and earth, with the switch 15 in series with the capacitor. The corresponding components associated with the other strips are connected in the same way. A collector or masking electrode 18 (FIGS. 1, 2, and 3) is positioned between the plates 13 and the strips, adjacent to the strips. The electrode 18 has four sides, 19 to 22, and is open ended at 23. It has an end plate 24 half covering the end 25, and a shelf 26 joined to the plate 24.

In a first mode of operation the electrode 18 is biased negative with respect to the strips and positive with respect to the gun by biasing means 42. For example, the electrode 18 may be at $-100$ V, the strips at earth potential before scanning and the cathode at $-1$ to 3 KV. The x-plates are supplied with a time-varying voltage from a variable time-base generator 29 causing an electron beam 30 from the gun to scan across the strips. The bias applied to the electrode 18 is sufficient to prevent secondary emission from the strips, so that the charge deposited on the strips is negative and due solely to the beam current.

The astigmatism and focus controls are set to give the beam a cross section of about 1 cm. × 0.5 mm. at the highest possible beam current. The beam can now carry a high current and still maintain the important horizontal dimension small so that overlap of the beam between the strips is reduced.

In the absence of a signal on the y-plates 12 the beam impinges on the part 24 of the electrode 18 and does not reach the strips. The repetitive signal which is to be averaged is applied to the y-plates 12 causing the beam to be deflected so that it reaches the strips to an extent dependent on the voltage of the applied signal. Thus the current reaching the strips is linearly related to the applied voltage, provided the beam has a suitable cross section. The time-base is adjusted to ensure that each strip is scanned at the same time in each period of the repetitive signal.

The line 31 in FIG. 4 is an example of a repetitive signal, the time of origin of each cycle being the origin of the graph. The time-scale may be regarded as being divided into 100 equal intervals corresponding to the 100 strips, intervals 32 to 40 being shown. Each of the capacitors associated with a strip will receive a charge proportional to the integral of the voltage applied to the y-plates 12 during the corresponding interval. When the signal which is to be averaged or totalized has been applied for a large number of times, the voltage across any one of the capacitors will, if the switch 15 is held closed, be proportional to the integral with respect to time of the average signal value, applied to the plates 12 when the strip connected to that capacitor is scanned. The voltage across any one of the capacitors will be proportional to the integral with respect to time of the signal when that capacitor is scanned, if the switch 15 is open.

To readout the charge on each capacitor must be measured. In one method the electrode 18 is biased positive with respect to the strips using the means 42 and the beam is scanned slowly across the strips, with the y-plates biased so that the beam reaches the strips completely discharging the capacitors by secondary emission from the strips. The charge on each capacitor is then obtained by means 43 for measuring the amplitude of current pulses, which occur in a common lead between earth and the capacitors, as each capacitor is discharged. The currents in the common lead may be passed to an amplifier which has a time constant which is slow compared with the current pulses and in this way an envelope of the pulses is obtained. This envelope represents a totalized or averaged waveform derived from the waveforms of the signals applied to the y-plates 12 during the repetitions of this signal.

An alternative method of readout is to cause the beam to scan quickly so that hardly any discharge takes place and to pass the resulting current pulses in the capacitors' common lead to a high-impedance amplifier which in this case is part of the means 43. In this way the voltage on each capacitor, which is proportional to its charge is read, and indicated by the amplifier output. Reading out in this way is virtually nondestructive.

In a second mode of operation the electrode 18 is biased positive with respect to the strips and with respect to the cathode of the electron gun 11. For example the electrode may now be at $+100$ volts while the strips are at 0 volts before scanning. The beam is deflected vertically as in the first mode, but it is now secondary emission from the strips which charges the capacitors. The strips must, therefore, have uniform secondary-emission coefficients. As in the first mode, the charge on any one of the capacitors after a large number of repetitions of the applied signal is proportional to the average voltage thereof during the interval when the strip associated with that capacitor is scanned, if the switch 15 is held closed. Opening the switch 15 gives a capacitor voltage proportional to the integral of the voltage applied during the appropriate interval.

Readout in the second mode is achieved in the same way except that the electrode 18 is biased negative with respect to the strips so that the beam impinges on the strips discharging the capacitors.

For more accurate readout in either mode each capacitor may be connected in turn to a conventional signal-averaging instrument.

Readout in the two modes may be by gating circuits coupled to the capacitors. The voltage on each capacitor is sampled sequentially by means 44 also shown in FIG. 1 to obtain the desired average or totalized signal. The second mode is more convenient for external readout with transistorized circuiting since the strips can be at voltages of, or near, earth potential. Readout by gating circuits has the advantage that it is virtually nondestructive and can be carried out at any time.

The capacitors may, as has been mentioned, comprise the strips and a common backing plate outside the tube provided the current in the capacitors' common earth lead is used for readout.

If the common backing plate is inside the tube readout must be obtained by measuring the current taken by the electrode 18 as the beam scans for readout in either mode, unless an external connection is provided for the backing plate. Such an arrangement is shown in FIG. 5 where a strip 45 inside a tube envelope 46 is separated by a dielectric 47 from a common internal backing plate 48. FIG. 5 also shows schematically a grid 49 adjacent to a cathode 50. As has been mentioned, such a grid can be used for intensity modulating the electron beam where it is not desired to use a collector electrode for spatial modulation.

The size of the capacitors and the resistors will be dictated only by the totalizing capacity or integration time-constant required, and the available beam current.

Other storage means may be used instead of capacitors.

The electron beam in the cathode-ray tube may be magnetically deflected instead of electrostatically as is specifically shown in the drawings.

With 100 strips on the face of a tube which has a bandwidth of 800 mHz and a vertical deflection sensitivity of 2 volts per centimeter, signals with periods of 100 nanoseconds or less can be totalized or averaged. Phase splitting for feeding the signal to the y-plates is only necessary for weak signals.

I claim:

1. A cathode-ray tube for use in apparatus for totalizing and averaging time-varying signals, including
    an electron gun for providing a beam of electrons,
    a plurality of discrete conductive elements,
    scanning means for causing the said beam to periodically scan across the said plurality of elements such that each element is scanned at the same relative time period during each cycle of said time-varying signals, and
    charge-control means for controlling the charge accumulated on each of said elements during each scanning cycle in accordance with time-varying signals applied to the said charge-control means at the moment of scanning such that, after a plurality of scanning cycles, the charge on each element represents an average or totalized value of said time-varying signals at the corresponding said relative time period during a cycle of said signals.

2. A cathode-ray tube according to claim 1 wherein the said charge control means include
    a collector electrode, and
    deflection means for deflecting the said beam to vary its position in relation to the said collector electrode in accordance with the applied signal and to vary the proportion of the said beam reaching each said conductive element during scanning.

3. A cathode-ray tube according to claim 2 wherein the said collector electrode is shaped as a hollow rectangular parallelepiped with closed sides which are of conductive material except for two sides, one of which is completely open and the other of which is partially covered by more conductive material joining three of the said closed sides,
    the said collector electrode being positioned to allow the said beam to pass therethrough by way of the said open side and the said opposite side, in at least one possible position of the said beam in relation to the said collector electrode.

4. A cathode-ray tube according to claim 2 wherein
    the said conductive elements include elongated parallel conducting strips adjacent to the face of the tube, and
    each said conductive element is coupled to a capacitor, one said capacitor being provided for each said strip and being individual thereto.

5. A cathode-ray tube according to claim 4 including means for imparting a rectangular cross section to the said electron beam with the longer dimension of the said cross section parallel to the said conducting strips.

6. A cathode-ray tube according to claim 5 wherein the said collector electrode is shaped as a hollow rectangular parallelepiped with closed sides which are of conductive material except for two sides, one of which is completely open and the other of which is partially covered by more conductive material joining three of the said closed sides,
    the said collector electrode being positioned to allow the said beam to pass therethrough by way of the said open side and the said opposite side, in at least one possible position of the said beam in relation to the said collector electrode.

7. A cathode-ray tube according to claim 6 wherein each said capacitor comprises one of the said strips, a dielectric and a backing plate.

8. A cathode-ray tube according to claim 5 including
    a plurality of resistors, each said resistor being adapted to be individually coupled across one of the said capacitors.

9. Apparatus for totalizing and averaging time-varying signals including
    a cathode-ray tube according to claim 4,
    means for biasing the said collector electrode in one sense with respect to the said strips while the signal to be totalized and averaged is applied to the said collector electrode,
    means for biasing the said collector electrode in the opposite sense during readout, and
    means for measuring the charge drawn from each said capacitor when the said elements are discharged by scanning with the said electron beam during readout.

10. Apparatus for totalizing and averaging time-varying signals including
    a cathode-ray tube according to claim 4,
    means for biasing the said collector electrode in one sense with respect to the said strips while the signal to be totalized and averaged is applied to the said collector electrode,
    means for biasing the said collector electrode in the opposite sense during readout, and
    means for measuring the voltage on each said capacitor by feeding a current from the capacitor to a high impedance measuring means when the said elements are scanned for a time short compared with the time required to discharge the said capacitors.

11. Apparatus for totalizing and averaging time-varying signals including
    a cathode-ray tube according to claim 4, wherein the said capacitors are external to the said tube, and
    means for sampling the voltage across each said capacitor sequentially.

12. A cathode-ray tube according to claim 1
    wherein the said charge-control means includes a grid electrode for intensity modulating the said electron beam, and
    a plurality of capacitors is provided, each said conductive element being coupled to one of the said capacitors individual thereto.

13. A cathode-ray tube according to claim 12 wherein
    each said capacitor comprises one of the said strips, a dielectric and a backing plate.

14. A cathode-ray tube according to claim 13 including
    a plurality of resistors, each said resistor being adapted to be individually coupled across one of the said capacitors.